US012125430B2

(12) United States Patent
Zhai

(10) Patent No.: US 12,125,430 B2
(45) Date of Patent: Oct. 22, 2024

(54) DISPLAY PANEL AND DISPLAY DEVICE

(71) Applicant: TIANMA ADVANCED DISPLAY TECHNOLOGY INSTITUTE (XIAMEN) CO., LTD., Xiamen (CN)

(72) Inventor: Yingteng Zhai, Xiamen (CN)

(73) Assignee: TIANMA ADVANCED DISPLAY TECHNOLOGY INSTITUTE (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 18/319,490

(22) Filed: May 18, 2023

(65) Prior Publication Data

US 2023/0343278 A1 Oct. 26, 2023

(30) Foreign Application Priority Data

Jan. 6, 2023 (CN) ......................... 202310018810.9

(51) Int. Cl.
*G09G 3/32* (2016.01)

(52) U.S. Cl.
CPC ....... *G09G 3/32* (2013.01); *G09G 2300/0408* (2013.01); *G09G 2310/0267* (2013.01); *G09G 2310/0275* (2013.01)

(58) Field of Classification Search
CPC ............. G09G 3/32; G09G 2310/0275; G09G 2300/0408; G09G 2310/0267; G09G 2300/0814; G09G 3/3266; G09G 3/3233; G09G 2300/0861
See application file for complete search history.

(56) References Cited

U.S. PATENT DOCUMENTS

2021/0167161 A1* 6/2021 Yang ..................... G09G 3/3275
2022/0199739 A1* 6/2022 Du ....................... G09G 3/3233
2023/0117873 A1* 4/2023 Kim ..................... G09G 3/3233
345/55

* cited by examiner

*Primary Examiner* — Muhammad N Edun
(74) *Attorney, Agent, or Firm* — KILPATRICK TOWNSEND & STOCKTON LLP

(57) ABSTRACT

A display panel and a display device are provided. The pixel circuit includes a drive device, a first light-emitting control device and a second light-emitting control device; the first light-emitting control device and the second light-emitting control device are configured to jointly control a light-emitting duration of the light-emitting element; the first light-emitting control device is electrically connected to the first light-emitting control signal line, the second light-emitting control device is connected to the second light-emitting control signal line.

20 Claims, 10 Drawing Sheets

DISPLAY PANEL AND DISPLAY DEVICE

This application claims priority to Chinese Patent Application No. 202310018810.9, titled "DISPLAY PANEL AND DISPLAY DEVICE", filed on Jan. 6, 2023 with the China National Intellectual Property Administration, which is hereby incorporated by reference in its entirety.

FIELD

The present disclosure relates to the field of display technology, and more particularly, to a display panel and a display device.

BACKGROUND

Micro-Led, as a new generation of display technology, has higher brightness, better light-emitting efficiency and lower power consumption than the conventional OLED. In Micro-Led, it is desired to set the current as large as possible, thus it is desired to control the grayscale brightness by controlling the light-emitting time. In the related technology, there is a method of adjusting the grayscale of Micro-Led by using the light-emitting time, but the pixel circuit used for the adjustment utilizes active drive with a relatively complicated structure. In practical applications, it is hard to achieve the design of high pixels per inch (PPI).

SUMMARY

In view of this, a display panel and a display device are provided according to the present disclosure.

In one embodiment, a display panel is provided according to the present disclosure, the display panel includes a pixel circuit, a light-emitting element and signal lines;

- the pixel circuit is electrically connected to the light-emitting element, and the pixel circuit includes a drive device, a first light-emitting control device and a second light-emitting control device;
- the drive device is configured to drive the light-emitting element to emit light;
- the first light-emitting control device and the second light-emitting control device are configured to jointly control a light-emitting duration of the light-emitting element;
- the signal lines include a first light-emitting control signal line and a second light-emitting control signal line, and the first light-emitting control device is electrically connected to the first light-emitting control signal line, the first light-emitting control signal line extends in a first direction, and the first direction is parallel to a plane where the display panel is located; the second light-emitting control device is connected to the second light-emitting control signal line, the second light-emitting control signal line extends in a second direction, the second direction is parallel to the plane where the display panel is located, and the first direction intersects with the second direction.

In one embodiment, a display device is provided according to the present disclosure, the display device includes a display panel. The display panel includes a pixel circuit, a light-emitting element and signal lines; the pixel circuit is electrically connected to the light-emitting element, and the pixel circuit includes a drive device, a first light-emitting control device and a second light-emitting control device; the drive device is configured to drive the light-emitting element to emit light; the first light-emitting control device and the second light-emitting control device are configured to jointly control a light-emitting duration of the light-emitting element; the signal lines include a first light-emitting control signal line and a second light-emitting control signal line, and the first light-emitting control device is electrically connected to the first light-emitting control signal line, the first light-emitting control signal line extends in a first direction, and the first direction is parallel to a plane where the display panel is located; the second light-emitting control device is connected to the second light-emitting control signal line, the second light-emitting control signal line extends in a second direction, the second direction is parallel to the plane where the display panel is located, and the first direction intersects with the second direction.

BRIEF DESCRIPTION OF THE DRAWINGS

The drawings, which are incorporated in and constitute a part of this specification, illustrate embodiments of the present disclosure. And, the drawings together with their description are used to explain the principles of the present disclosure.

DETAILED DESCRIPTION OF EMBODIMENTS

Figure 1:
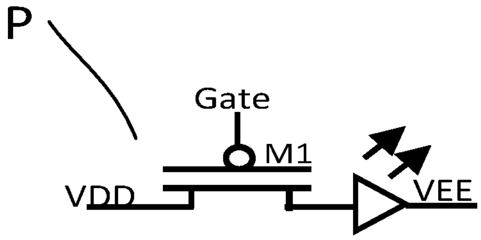
FIG. 1 is a pixel circuit diagram in the related technology.

Various exemplary embodiments of the present disclosure will now be described in detail with reference to the drawings. It should be noted that the relative arrangements of components and steps, numerical expressions and numerical values set forth in these embodiments do not limit the scope of the present disclosure unless specifically stated otherwise.

The description of at least one exemplary embodiment, hereinafter, is merely illustrative in nature and in no way taken as any limitation to the present disclosure and the application or usages thereof.

Technologies, methods and devices may not be discussed in detail, but where appropriate, such technologies, methods and devices should be considered part of the description.

In all embodiments shown and discussed herein, any specific values should be construed as exemplary only, rather than limitations. Hence, other instances of the exemplary embodiment may have different values.

Various modifications and variations can be made in the present disclosure without departing from the spirit or scope of the present disclosure. Therefore, the present disclosure is intended to cover the modifications and variations of the present disclosure falling within the scope of the corresponding claims (solutions to be protected) and their equivalents. It should be noted that, the implementations provided in the embodiments of the present disclosure may be combined with each other if there is no contradiction.

It should be noted that like numerals and letters denote like items in the drawings, therefore, once an item is defined in one figure, it does not require further discussion in subsequent figures.

According to the present disclosure, the display panel includes a pixel circuit, a light-emitting element and signal lines. The pixel circuit is electrically connected to the light-emitting element, and the pixel circuit includes a drive device, a first light-emitting control device and a second light-emitting control device. The drive device is configured to drive the light-emitting element to emit light. The first light-emitting control device and the second light-emitting control device are configured to jointly control a light-emitting duration of the light-emitting element. The signal lines include a first light-emitting control signal line and a second light-emitting control signal line. The first light-emitting control device is electrically connected to the first light-emitting control signal line, the first light-emitting control signal line extends in a first direction, and the first direction is parallel to a plane where the display panel is located. The second light-emitting control device is connected to the second light-emitting control signal line, the second light-emitting control signal line extends in a second direction, the second direction is parallel to the plane where the display panel is located, and the first direction intersects with the second direction.

In the present disclosure, the light-emitting duration of the light-emitting element is controlled jointly by the first light-emitting control device and the second light-emitting control device, where the control signals of the first light-emitting control device and the second light-emitting control device can be transmitted through the first light-emitting control signal line and the second light-emitting control signal line respectively. As a result, the grayscale of the pixel can be adjusted by changing the control signals transmitted by the first light-emitting control signal line and the second light-emitting control signal line. In addition, the first light-emitting control signal lines and the second light-emitting control signal lines are in an intersected arrangement in the present disclosure, and the first light-emitting control signal lines and the second light-emitting control signal lines can form a grid-like control structure, which is conducive to reducing the quantity of the first light-emitting control signal lines and the second light-emitting control signal lines. Hence, a simple structure and convenient control are achieved, which are beneficial to achieve high PPI.

The above are embodiments of the present disclosure, and will be clearly and completely described below in conjunction with the drawings of the embodiments of the present disclosure.

Figure 2:
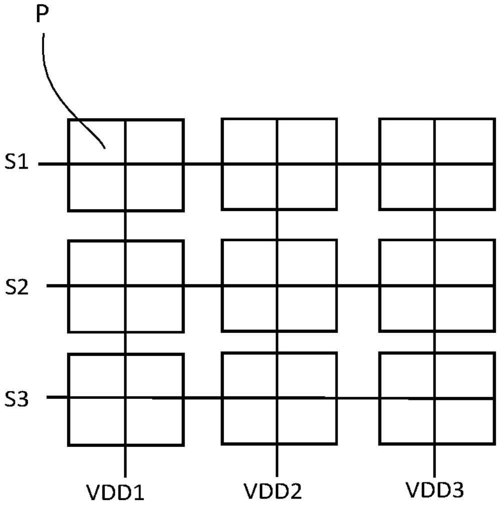
FIG. 2 is a schematic diagram of a pixel circuit array in the related technology.
Figure 3:
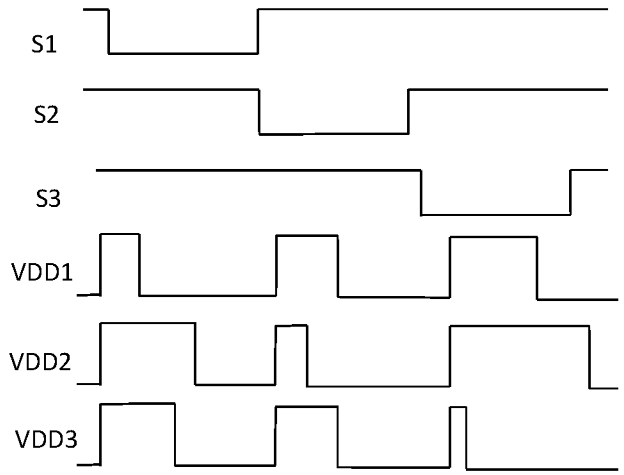
FIG. 3 is a timing diagram of the pixel circuit array shown in FIG. 2.

In order to solve the problems mentioned in the background, a solution is provided. FIG. 1 shows a pixel circuit diagram of the solution; FIG. 2 shows a schematic diagram of a pixel circuit array; FIG. 3 shows a timing diagram of the pixel circuit array shown in FIG. 2. FIG. 1, FIG. 2 and FIG. 3 are referred to in the following description.

As shown in FIG. 1, the pixel circuit P includes a drive transistor M1. The control terminal of the drive transistor M1 is used to receive a control signal Gate, the first terminal of the drive transistor M1 is used to receive a power supply signal VDD, and the second terminal of the drive transistor M1 is used to connect to the anode of the light-emitting element to drive the light-emitting element to emit light.

As shown in FIG. 2, the pixel circuit P is arranged in a matrix of three rows and three columns, in which the scanning signal line S1, scanning signal line S2 and scanning signal line S3 for providing the control signals Gate are arranged in rows, the power signal line VDD1, the power signal line VDD2 and the power signal line VDD3 for providing the power signals VDD are arranged in columns.

As shown in FIG. 3, when the pixel circuit P is driven, the drive transistor M1 is turned on via the control signal Gate by each of the scanning signal line S1, the scanning signal line S2, and the scanning signal line S3 row by row. When the drive transistor M1 is turned on by each row, the light-emitting time and brightness per frame are determined by the high-level duration of the power supply signal VDD.

Even though the pixel circuit and driving timing shown in FIGS. 1 to 3 have a simple pixel circuit structure with a simple driving scheme, such pixel circuit and driving scheme have high requirements on the driving IC and require the use of multiple current source devices, ending up with a relatively significant cost.

Figure 4:
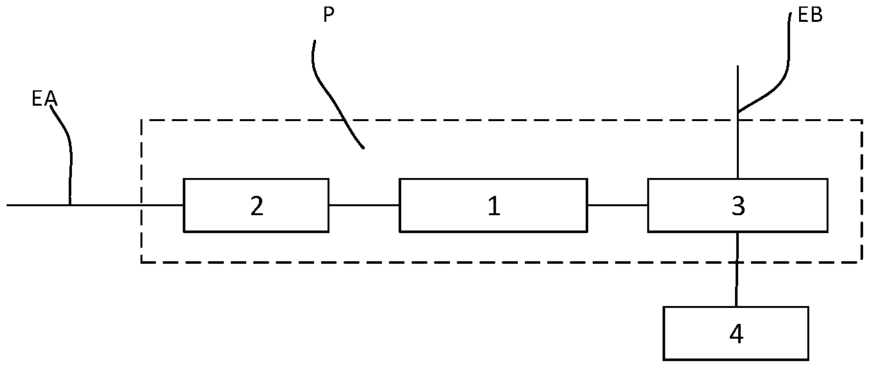
FIG. 4 is a schematic component diagram of a display panel according to an embodiment of the present disclosure.
Figure 5:
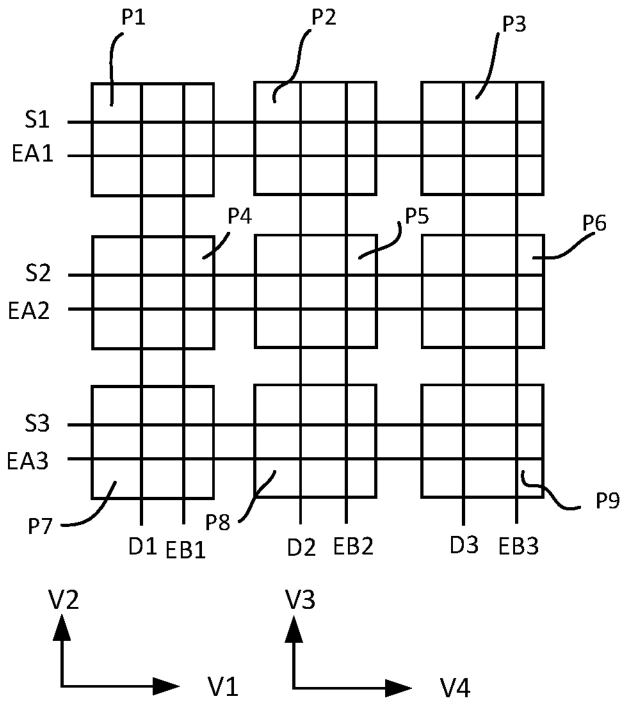
FIG. 5 is a schematic component diagram of a display panel according to another embodiment of the present disclosure.

Referring to FIG. 4 and FIG. 5, FIG. 4 shows a schematic component diagram of a display panel according to an embodiment of the present disclosure; FIG. 5 shows a schematic component diagram of a display panel according to another embodiment of the present disclosure. According to the present disclosure, the display panel includes a pixel circuit P, a light-emitting element 4 and signal lines. The pixel circuit P is electrically connected to the light-emitting element 4, and the pixel circuit P includes a drive device 1, a first light-emitting control device 2 and a second light-emitting control device 3. The drive device 1 is configured to drive the light-emitting element 4 to emit light. The first light-emitting control device 2 and the second light-emitting control device 3 are configured to jointly control a light-emitting duration of the light-emitting element 4. The signal lines include a first light-emitting control signal line EA and a second light-emitting control signal line EB. The first light-emitting control device 2 is electrically connected to the first light-emitting control signal line EA, the first light-emitting control signal line EA extends in a first direction V1, and the first direction V1 is parallel to a plane where the display panel is located. The second light-emitting control device 3 is connected to the second light-emitting control signal line EB, the second light-emitting control signal line EB extends in a second direction V2, the second direction V2 is parallel to the plane where the display panel is located, and the first direction V1 intersects with the second direction V2.

Compared to the pixel circuit shown in FIG. 1, the pixel circuit in FIG. 4 eliminates the use of the VDD power supply signal as the control signal of the light-emitting time. The first light-emitting control device 2 and the second light-emitting control device 3 are provided. The light-emitting time of the light-emitting element 4 is determined through a coordination of the first light-emitting control device 2 and the second light-emitting control device 3, and the light-emitting time of the light-emitting element 4 driven by the pixel circuit P is no longer subjected to the VDD power supply signal, to lower the cost of the driving IC.

Figure 6:
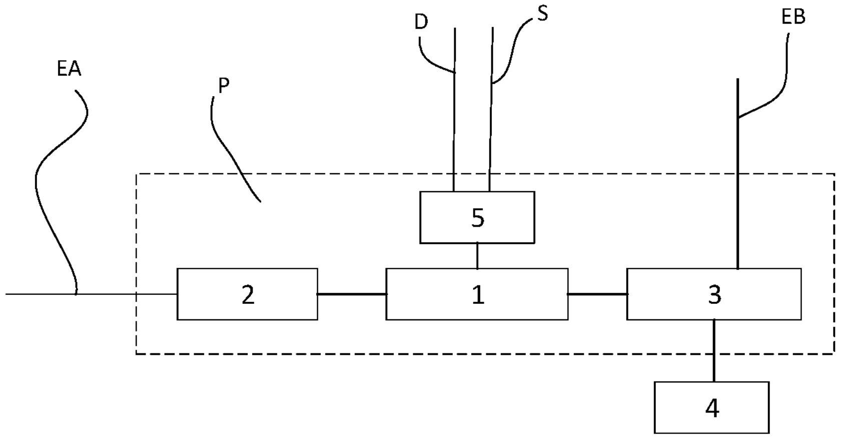
FIG. 6 is a schematic component diagram of a display panel according to another embodiment of the present disclosure.

FIG. 6 shows a schematic component diagram of a display panel according to another embodiment of the present disclosure. Referring to FIG. 6, in some embodiments of the present disclosure, the pixel circuit P of the present disclosure further includes a data writing device 5, and the data writing device 5 is configured to transmit the data signal to the control terminal of the drive device 1.

As shown in FIG. 6, the data writing device 5 is connected to the scanning signal line S and the data signal line D. Under the control of the valid signal transmitted by the scanning signal line S, the data signal DATA is written into the drive device 1 through the data signal line D. In a specific application, the output current of the drive device 1 may be controlled by the data signal DATA written by the data writing device 5.

Figure 7:
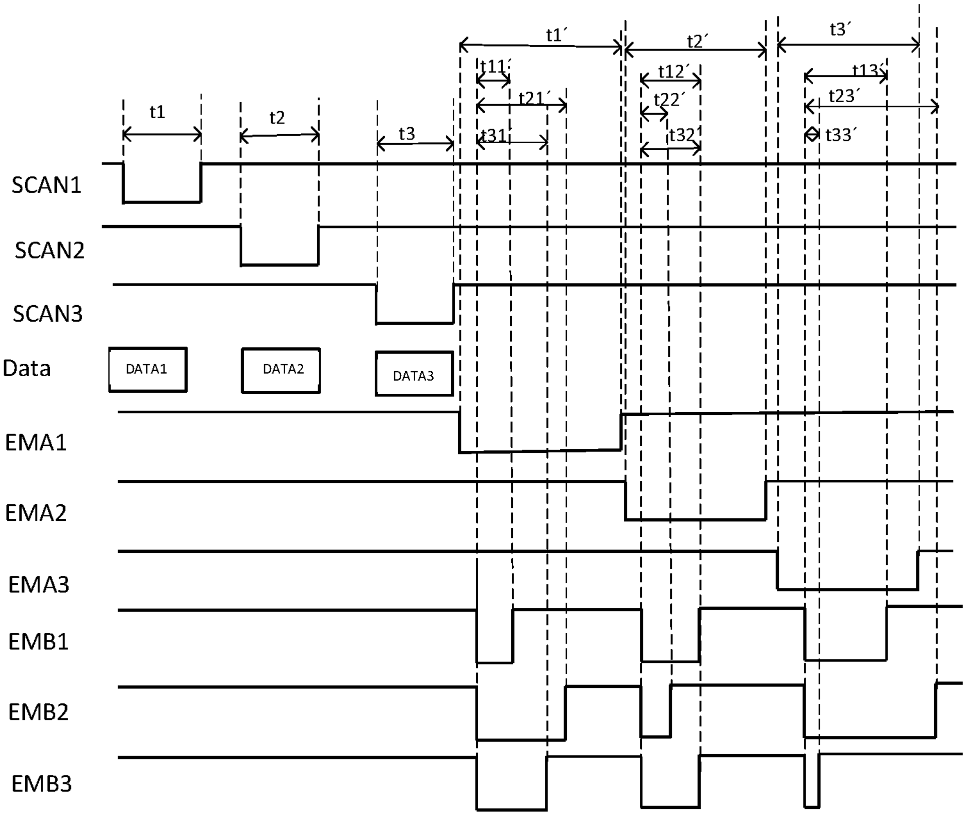
FIG. 7 is a driving timing diagram of a pixel circuit according to an embodiment of the present disclosure.

FIG. 7 is a driving timing diagram of the pixel circuit according to an embodiment of the present disclosure. Reference is made to FIG. 5 and FIG. 7. As shown in FIG. 5, S1, S2, S3 are all scanning signal lines; D1, D2, D3 are all data signal lines; EA1, EA2, and EA3 are all first light-emitting control signal lines, and EB1, EB2, and EB3 are all second light-emitting control signal lines. As shown in FIG. 7, t1 represents the activated time period of the scanning signal SCAN1 transmitted by the scanning signal line S1, t2 represents the activated time period of the scanning signal SCAN2 transmitted by the scanning signal line S2, and t3 represents the activated time period of the scanning signal SCAN3 transmitted by the scanning signal line S3; t1' represents the activated time period of the signal transmitted by the first light-emitting sub-control signal line EA1, t2' represents the activated time period of the signal transmitted by the second light-emitting sub-control signal line EA2, and t3' represents the activated time period of the signal transmitted by the fifth light-emitting sub-control signal line EA3; t11' represents a first activated time period of the signal transmitted by the third light-emitting sub-control signal line EB1, t12' represents a second activated time period of the signal transmitted by the third light-emitting sub-control signal line EB1, and t13' represents a third activated time period of the signal transmitted by the third light-emitting sub-control signal line EB1; t21' represents a first activated time period of the signal transmitted by the fourth light-emitting sub-control signal line EB2, t22' represents a second activated time period of the signal transmitted by the fourth light-emitting sub-control signal line EB2, and t23' represents a third activated time period of the signal transmitted by the fourth light-emitting sub-control signal line EB2; t31' represents a first activated time period of the signal transmitted by the sixth light-emitting sub-control signal line EB3, t32' represents a second activated time period of the signal transmitted by the sixth light-emitting sub-control signal line EB3, and t33' represents a third activated time period of the signal transmitted by the sixth light-emitting sub-control signal line EB3.

With reference to FIG. 5, FIG. 6 and FIG. 7, when adjusting the grayscale of the light-emitting element, the light-emitting intensity may be adjusted first. For example, under the control of the activated signal transmitted by the scanning signal line S1, the data signal DATA1 is written into the driver device 1 of the pixel circuit P1 through the data signal line D1; the data signal DATA2 is written into the driver device 1 of the pixel circuit P2 through the data signal line D2; the data signal DATA3 is written into the driver device 1 of the pixel circuit P3 through the data signal line D3. The approach of writing data signal in pixel circuit P4, pixel circuit P5, pixel circuit P6, pixel circuit P7, pixel circuit P8 and pixel circuit P9 is the same as that of pixel circuit P1, pixel circuit P2 and pixel circuit P3. In this way, the output current of each pixel circuit may be adjustable by adjusting the inputted DATA signal, to control the light-emitting intensity.

Then, the light-emitting duration is adjusted. For example, by controlling the activated time period t1' of the first light-emitting control signal EMA1 transmitted by the first light-emitting control signal line EA1 and the activated time period t11' of the second light-emitting control signal EMB1 transmitted by the second light-emitting control signal line EB1, the light-emitting duration of the light-emitting element 4 driven by the pixel circuit P1 is controlled through an overlapped time period between the two activated time periods. Similarly, by adjusting the activated time period of the first light-emitting control signal transmitted by each of the first light-emitting control signal lines EA1, EA2 and EA3 and the activated time period of the second light-emitting control signal transmitted by each of the second light-emitting control signal lines EB1, EB2 and EB3, the light-emitting duration of the light-emitting element driven by the corresponding pixel circuit is adjusted and controlled through the overlapped time period between the two activated time periods.

The light-emitting intensity of the light-emitting element 4 is first controlled by the data writing device 5, and then the light-emitting duration of the light-emitting element 4 is controlled by the first light-emitting control signal line EA and the second light-emitting control signal line EB. By doing so, the grayscale of the light-emitting element 4 can be adjusted in terms of both light-emitting time and light-emitting intensity, to achieve more levels of grayscale adjustment and more delicate presentation of images, which is suitable for high-end products. In addition, the grayscale of pixel may be adjusted by utilizing the light-emitting time and light-emitting intensity coordinately. As an example, it is desired to set the current as large as possible in the Micro-LED. Hence, it is desired to control the grayscale brightness by precisely controlling the light-emitting time, and the LED can operate with the optimal operating current in different grayscales. As another example, when displaying in the low grayscale, the current intensity may be used for auxiliary adjustment given inadequate control precision for the light-emitting time.

It should be noted that, for the convenience of describing the embodiment, it is shown in FIG. 5 that the display panel includes 9 pixel circuits, but it is not meant to limit that the panel includes only 9 pixel circuits. The purpose of this example is to illustrate the method of adjusting the pixel grayscale through the current intensity and adjusting the pixel grayscale through the light-emitting time, and it is not intended to limit the structure of the display panel in the present disclosure. In practical applications, the quantity of pixel circuits in the panel may be determined as required.

Figure 8:
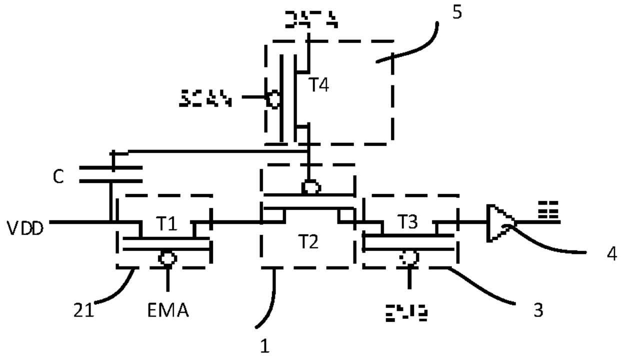
FIG. 8 shows a pixel circuit of a display panel according to a specific embodiment of the present disclosure.

FIG. 8 shows a pixel circuit of a display panel according to a specific embodiment of the present disclosure. Referring to FIG. 8, in some embodiments of the present disclosure, the first light-emitting control device 2 includes a first sub-control device 21, a first terminal of the first sub-control device 21 is used to receive the power supply signal VDD, a second terminal of the first sub-control device 21 is electrically connected to a first terminal of the drive device 1, and a control terminal of the first sub-control device 21 is electrically connected to the first light-emitting control signal line EA; a first terminal of the second light-emitting control device 3 is electrically connected to the drive device 1, a second terminal of the second light-emitting control device 3 is electrically connected to the anode of the light-emitting element 4, and a control terminal of the second light-emitting control device 3 is electrically connected to the second light-emitting control signal line EB.

Referring to FIG. 6 and FIG. 8, the pixel circuit P includes the first sub-control device 21, the drive device 1, the second light-emitting control device 3 and the data writing device 5. The first sub-control device 21 includes a first transistor T1, the drive device 1 includes a second transistor T2, the second light-emitting control device 3 includes a third transistor T3, and the data writing device 5 includes a fourth transistor T4. The first electrode of the first transistor T1 is used to receive the power supply signal VDD, the second electrode of the first transistor T1 is electrically connected to the first electrode of the second transistor T2, the control electrode of the first transistor T1 is electrically connected to the first light-emitting control signal line EA, and the first light-emitting control signal line EA is used to transmit the first light-emitting control signal EMA; the first electrode of the third transistor T3 is electrically connected to the second electrode of the second transistor T2, the second electrode of the third transistor T3 is electrically connected to the anode of the light-emitting element 4, and the first electrode of the third transistor T3 is electrically connected to the second light-emitting control signal line EB, and the second light-emitting control signal line EB is used to transmit the second light-emitting control signal EMB; the control electrode of the fourth transistor T4 is used to receive the scanning signal SCAN, the first electrode of the fourth transistor T4 is used to receive the data signal DATA, and the second electrode of the fourth transistor T4 is electrically connected to the control electrode of the second transistor T2.

Figure 9:
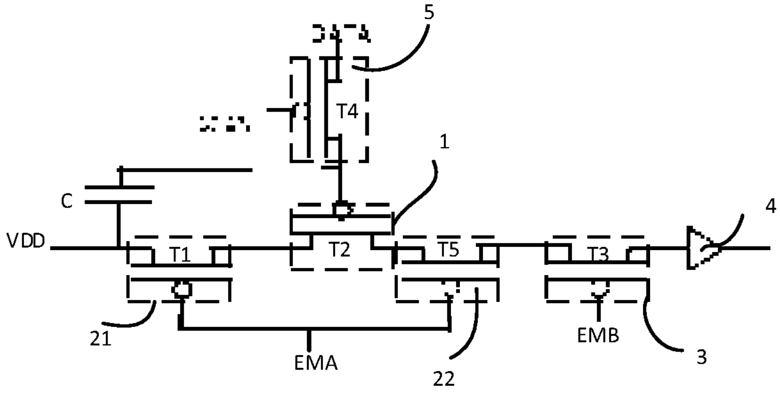
FIG. 9 shows a pixel circuit of a display panel according to a specific embodiment of the present disclosure.

FIG. 9 shows a pixel circuit of a display panel according to a specific embodiment of the present disclosure. Referring to FIG. 6 and FIG. 9, in some embodiments of the present disclosure, the first light-emitting control device 2 further includes a second sub-control device 22. The second sub-control device 22 is located between the drive device 1 and the second light-emitting control device 3. The first terminal of the second sub-control device 22 is electrically connected to the second terminal of the drive device 1, the second terminal of the second sub-control device 22 is electrically connected to the first terminal of the second light-emitting control device 3, and the control terminal of the second sub-control device 22 is electrically connected to the first light-emitting control signal line EA.

Further referring to FIG. 9, in the embodiment shown in FIG. 9, the second sub-control device 22 includes a fifth transistor T5, and the fifth transistor T5 is located between the drive device 1 and the second light-emitting control device 3. The first electrode of fifth transistor T5 is electrically connected to the second electrode of the second transistor T2, the second electrode of the fifth transistor T5 is electrically connected to the first electrode of the third transistor T3, and the control electrode of the fifth transistor T5 is electrically connected to the first light-emitting control signal line EA, where the first light-emitting control signal line EA is used to transmit the first light-emitting control signal EMA.

It should be noted that, the first transistor T1, each of the second transistor T2, the third transistor T3, the fourth transistor T4, and the fifth transistor T5 in the pixel circuit may be PMOS or NMOS. Alternatively, some transistors are PMOSs, while other transistors are NMOSs. Whether the first electrode and the second electrode are the source or drain of the transistor may be determined according to the specific circuit.

Further referring to FIG. 9, in the present disclosure, the first light-emitting control device includes a first sub-control device 2 and a second sub-control device 6. The second sub-control device 6 is located between the drive device 1 and the second light-emitting control device 3, and the second sub-control device 6 mainly functions to stabilize the driving current of the drive device 1, and the second light-emitting control device 3 in the pixel circuit of the current row can be turned on in the case that the pixel circuit of the current row has finished the data-writing while pixel circuits of other rows are in the process of data-writing. In the present disclosure, in the period of one image frame, the light-emitting stage of the light-emitting element 4 overlaps part of the data writing stage. Hence, in the present disclosure, the light-emitting stage of the light-emitting element 4 can be made happen earlier by setting the second sub-control device 6.

Further referring to FIG. 8 and FIG. 9, in some specific embodiments, the pixel circuit includes a capacitor C, the first plate of the capacitor C is electrically connected to the control electrode of the second transistor T2, and the second plate of the capacitor C is electrically connected to a first fixed potential line. It should be noted that the first fixed potential line is used to transmit the first fixed potential, and the first fixed potential may be the power supply signal VDD of display panel, or other fixed voltage signals.

Referring back to FIG. 5 and FIG. 6, in some embodiments of the present disclosure, the first terminal of the data writing device 5 is electrically connected to the data signal line S, and the data line S extends in the third direction V3. The third direction V3 is parallel to the plane where the display panel is located; the control terminal of the data writing device 5 is electrically connected to the scanning signal line S, and the scanning signal line S extends in the fourth direction V4, and the fourth direction V4 is parallel to the plane where the display panel is located. The third direction V3 intersects with the fourth direction V4.

Further referring to FIG. 5, S1, S2, and S3 in FIG. 5 are all scanning signal lines, where the first scanning signal line S1, the second scanning signal line S2, and the third scanning signal line S3 all extend in the fourth direction V4. Each scanning signal line is electrically connected to the control terminal of the data writing device of the pixel circuit located in the direction (i.e., the fourth direction) of the scanning signal line. D1, D2, and D3 are all data signal lines, and the first data signal line D1, the second data signal line D2 and the third data signal line D3 all extend in the third direction V3. Each data signal line is electrically connected to the control terminal of the data writing device of the pixel circuit located in the direction (i.e., the third direction V3) of the data signal line. In this way, a grid-like data writing structure is formed, which can write data voltage signals for each pixel circuit in the pixel circuit array.

It should be noted that the layout of the pixel circuits and signal lines shown in FIG. 5 is one embodiment of the present disclosure, and the layout of the pixel circuits and signal lines of the present disclosure may have other forms.

In some embodiments of the present disclosure, the third direction V3 is parallel to the first direction V1; or, the third direction V3 is parallel to the second direction V2.

With reference to FIG. 5 and FIG. 7, the third direction V3 is parallel to the first direction V1; or, the third direction V3 is parallel to the second direction V2, which is suitable for some square display screens, as shown in FIG. 5. FIG. 5 includes multiple pixel circuits, such as pixel circuit P1, pixel circuit P2, pixel circuit P3 . . . and pixel circuit P9. The pixel circuit P1, pixel circuit P2, pixel circuit P3 . . . and pixel circuit P9 are arranged in a rectangle, where the EA1, EA2 and EA3 are the first light-emitting control signal lines, EB1, EB2 and EB3 are the second light-emitting control signal lines, and the extension directions of the first light-emitting control signal lines EA1, EA2 and EA3 are the first direction V1; the extension directions of the second light-emitting control signal lines EB1, EB2 and EB3 are the second direction V2; D1, D2 and D3 are all data signal lines, and the extension directions of data signal lines D1, D2, D3 are the third direction V3; the third direction V3 is parallel to the second direction V2; S1, S2 and S3 are all scanning signal lines, and the extension directions of scanning signal lines S1, S2 and S3 are the fourth direction V4. The first light-emitting control signal line EA1 is connected to the pixel circuit P1, the pixel circuit P2 and the pixel circuit P3 in the extension direction of the first light-emitting control signal line EA1; and the second light-emitting control signal line EB1 is connected to the pixel circuit P1, the pixel circuit P4 and the pixel circuit P7 in the extension direction of the second light-emitting control signal line EB1. The light-emitting duration of the light-emitting element connected to the pixel circuit P1 is determined jointly by the activated time period t1' of the first light-emitting control signal EMA1 transmitted by the first light-emitting control signal line EA1 and the activated time period t11' of the second light-emitting control signal EMB1 transmitted by the second light-emitting control signal line EB1; similarly, the light-emitting durations of other pixel circuits are also determined by the activated signals transmitted by the first light-emitting control signal lines and the second light-emitting control signal lines to which the pixel circuits are respectively connected. The first data signal line D1 is connected to the pixel circuit P1, the pixel circuit P4 and the pixel circuit P7 in the extension direction of the first data signal line D1; and the first scanning signal line S1 is connected to the pixel circuit P1, the pixel circuit P2 and the pixel circuit P3 in the extension direction of the first scanning signal line S1. Then the driving current output by the pixel circuit P1 is determined by the data signal DATA1 written by the first data signal line D, under the control of the activated time period t1 of the first scanning signal SCAN1 inputted by the first scanning signal line S1; similarly, the driving current of other pixel circuits are also determined by activated time periods of the signals transmitted by scanning signal lines and data signal lines to which the pixel circuits are respectively connected. In some other embodiments, the third direction V3 of each data signal line (D1, D2, D3) is parallel to the first direction V1.

In some embodiments of the present disclosure, the third direction V3 intersects with the first direction V1, and the third direction V3 intersects with the second direction V2.

Figure 10:
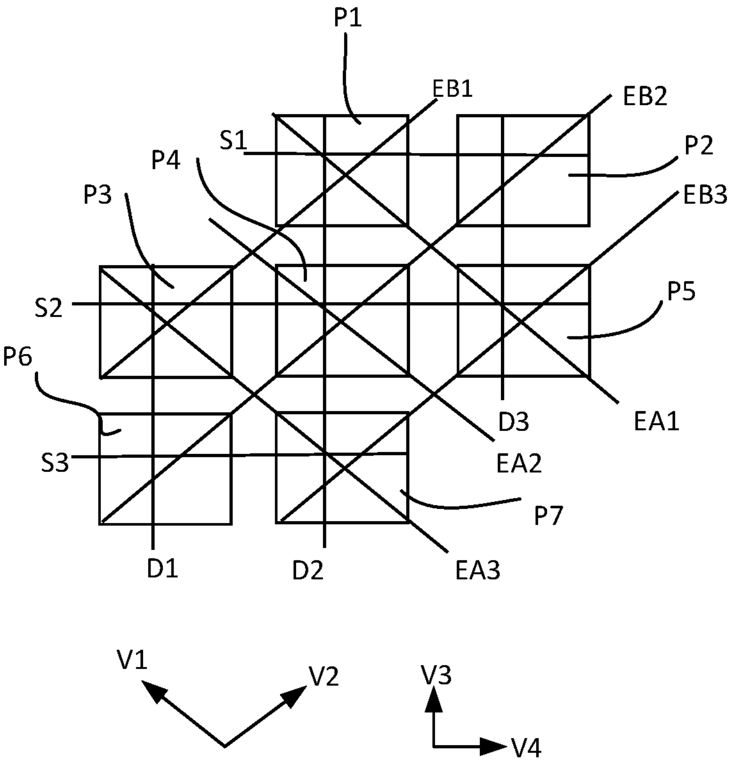
FIG. 10 is a schematic diagram of a display panel according to the present disclosure.

The solution that the third direction V3 intersects with the first direction V1 and the third direction V3 intersects with the second direction V2 in the present disclosure is applicable to some special-shaped display screens. The term "special-shaped screen" refers to display screens in irregular shape, or display screens having holes or notches formed thereon. As shown in FIG. 10, FIG. 10 is a schematic diagram of a display panel according to another embodiment of the present disclosure; FIG. 10 includes multiple pixel circuits, such as pixel circuit P1, pixel circuit P2, pixel circuit P3 . . . and pixel circuit P7. The pixel circuit P1, pixel circuit P2, pixel circuit P3 . . . and pixel circuit P7 are in a special-shaped arrangement, where EA1, EA2 and EA3 are the first light-emitting control signal lines, EB1, EB2 and EB3 are the second light-emitting control signal lines, the extension directions of the first light-emitting control signal lines EA1, EA2 and EA3 are the first direction V1, and the extension directions of the second light-emitting control signal lines EB1, EB2, and EB3 are the second direction V2; D1, D2, and D3 are all data signal lines, and the extension directions of data signal lines D1, D2, and D3 are the third direction V3, the third direction V3 intersects with the first direction V1, and the third direction V3 intersects with the second direction V2; S1, S2 and S3 are all scanning signal lines, and the extension directions of scanning signal lines S1, S2 and S3 are the fourth direction V4. The first light-emitting control signal line EA1 is connected to the pixel circuit P1 and the pixel circuit P5 in the extension direction of the first light-emitting control signal line EA1; and the second light-emitting control signal line EB1 is connected to the pixel circuit P1 and the pixel circuit P3 in the extension direction of the second light-emitting control signal line EB1. With reference to FIGS. 7 to 10, the light-emitting duration of the light-emitting element connected to the pixel circuit P1 is determined jointly by the activated time period t1' of the signal EMA1 transmitted by the first light-emitting control signal line EA1 and the activated time period t11' of the signal EMB1 transmitted by the second light-emitting control signal line EB1; similarly, the light-emitting durations of other pixel circuits are also determined jointly by the activated signals transmitted by the first light-emitting control signal lines and the second light-emitting control signal lines to which the pixel circuits are respectively connected. The first data signal line D1 is connected to the pixel circuit P6 and the pixel circuit P3 in the extension direction of the first data signal line D1; and the first scanning signal line S3 is connected to the pixel circuit P6 and the pixel circuit P7 in the extension direction of the first scanning signal line S3. Then the driving current output by the pixel circuit P6 is determined by the data signal written by the first data signal line D1, under the control of the activated signal inputted by the first scanning signal line S1; similarly, the driving current of other pixel circuits are also be determined by activated signals transmitted by scanning signal lines and data signal lines to which the pixel circuits are respectively connected.

In some embodiments of the present disclosure, the first direction V1 is parallel to the fourth direction V4, and the first direction V1 intersects with the third direction V3.

Figure 11:
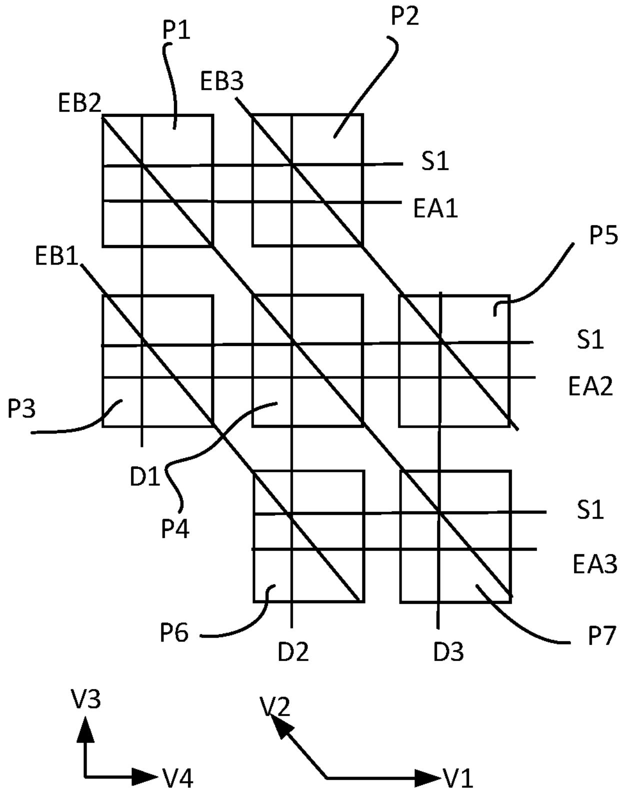
FIG. 11 is a schematic diagram of a display panel according to the present disclosure.

The solution that the first direction V1 is parallel to the fourth direction V4 and the first direction V1 intersects with the third direction V3 in the present disclosure is also applicable to some special-shaped display screens. As shown in FIG. 11, FIG. 11 is a schematic diagram of a display panel according to another embodiment of the present disclosure. FIG. 11 includes multiple pixel circuits, such as pixel circuit P1, pixel circuit P2, pixel circuit P3 . . . and pixel circuit P7. The pixel circuit P1, pixel circuit P2, pixel circuit P3, . . . and pixel circuit P7 are in a special-shaped arrangement, where EA1, EA2 and EA3 are the first light-emitting control signal lines, EB1, EB2 and EB3 are the second light-emitting control signal lines, and the extension directions of the first light-emitting control signal lines EA1, EA2 and EA3 are the first direction V1, the extension directions of the second light-emitting control signal lines EB1, EB2 and EB3 are the second direction V2; D1, D2 and D3 are all data signal lines, and the extension directions of data signal lines D1, D2, and D3 are the third direction V3; S1, S2 and S3 are all scanning signal lines, and the extension directions of scanning signal lines S1, S2 and S3 are the fourth direction V4; the first direction V1 is parallel to the fourth direction V4, and the first direction V1 intersects with the third direction V3. The first light-emitting control signal line EA1 is connected to the pixel circuit P1 and the pixel circuit P2 in the extension direction of the first light-emitting control signal line EA1; and the second light-emitting control signal line EB2 is connected to the pixel circuit P1, the pixel circuit P4 and the pixel circuit P7 in the extension direction of the second light-emitting control signal line EB2. With reference to FIGS. 7 to 10, the light-emitting duration of the light-emitting element connected to the pixel circuit P1 is determined by the activated time period t1' of the signal EMA1 transmitted by the first light-emitting control signal line EA1 and the activated time period t11' of the signal EMB1 transmitted by the second light-emitting control signal line EB2; similarly, the light-emitting durations of other pixel circuits are also determined by the activated time periods of the signals transmitted by the first light-emitting control signal lines and the second light-emitting control signal lines to which the pixel circuits are respectively connected. The first data signal line D1 is connected to the pixel circuit P3 and the pixel circuit P1 in the extension direction of the first data signal line D1; and the first scanning signal line S1 is connected to the pixel circuit P1 and the pixel circuit P2 in the extension direction of the first scanning signal line S1. Then, the driving current output by the pixel circuit P1 is determined by the data signal DATA1 written by the first data signal line D1, under the control of the activated time period t1 of the scanning signal SCAN1 inputted by the first scanning signal line S1; similarly, the driving current of other pixel circuits are also determined by activated signals transmitted by the scanning signal lines and data signal lines to which the pixel circuits are respectively connected.

Figure 12:
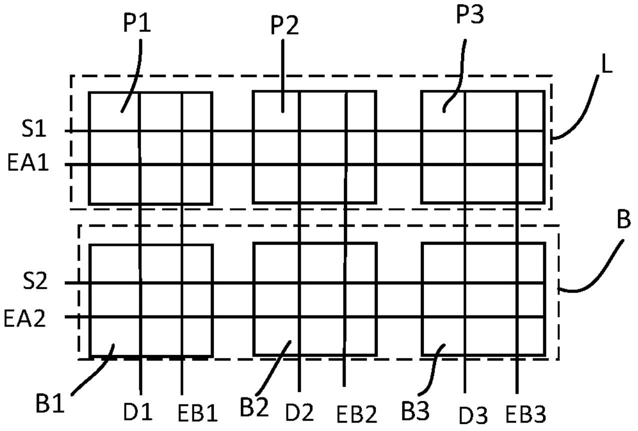
FIG. 12 is a schematic diagram of a display panel according to the present disclosure.
Figure 13:
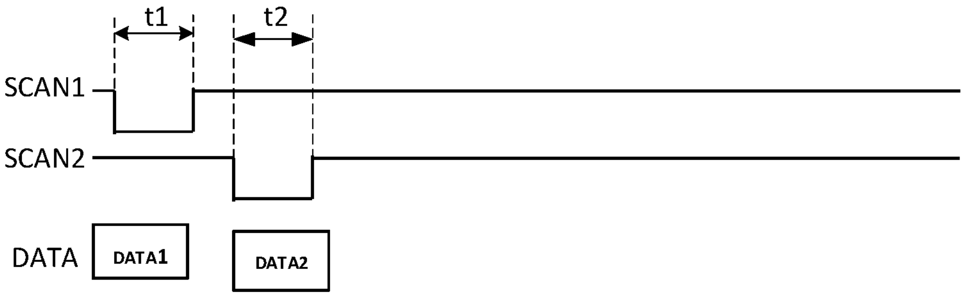
FIG. 13 is a timing diagram of data writing according to the present disclosure.

FIG. 12 is a schematic diagram of a display panel according to the present disclosure; and FIG. 13 is a timing diagram of data writing according to the present disclosure.

Referring to FIG. 12 and FIG. 13, the pixel circuit in the present disclosure includes a first pixel circuit set L and a second pixel circuit set B, the scanning signal lines include the first scanning signal line S1 and the second scanning signal line S2; the first pixel circuit set L is electrically connected to the first scanning signal line S1, and the first scanning signal line S1 provides the first scanning signal SCAN1 to the first pixel circuit set L; the second pixel circuit set B is electrically connected to the second scanning signal line S2, and the scanning signal line S2 provides the second scanning signal SCAN2 to the second pixel circuit set B; the duration of the activated time period t1 of the first scanning signal SCAN1 is the same as that of the activated time period t2 of the second scanning signal SCAN2 in a same display cycle, and the activated time periods of the first scanning signal SCAN1 and the second scanning signal SCAN2 are at least partially non-overlapped.

It should be noted that FIG. 12 and the corresponding FIG. 13 show one embodiment of the present disclosure, which are not intended to limit the pixel circuit and driving timing in the present disclosure. For example, the first pixel circuit set A may include more pixel circuit units or less pixel circuit units.

In practical applications, the pixel circuit in the present disclosure may include more pixel circuit sets, and each pixel circuit set is electrically connected to the corresponding scanning signal line. And, in the same display cycle, the duration of the activated time period of each scanning signal line is the same, and the activated time periods of the scanning signal lines are at least partially non-overlapped with one another. In some embodiments, the activated time periods of the scanning signal lines are not overlapped with one another at all. As shown in FIG. 13, the activated time period t1 of the scanning signal SCAN1 transmitted by the first scanning signal line S1 and the activated time period t2 of the scanning signal SCAN2 transmitted by the second scanning signal line S2 are not overlapped with each other at all.

Further referring to FIG. 12 and FIG. 13, in some embodiments of the present disclosure, the first pixel circuit set L includes the first pixel circuit P1, and the second pixel circuit set B includes the second pixel circuit B2. P1 is electrically connected to the first data signal line D1, the first data signal line D1 provides the first data signal DATA1 to the first pixel circuit P1 in the activated time period t1 of the first scanning signal SCAN1; the second pixel circuit B2 is electrically connected to the second data signal line D2, and the second data signal line D2 provides the second data signal DATA2 to the second pixel circuit B2 in the active time period t2 of the second scan signal SCAN2.

Further referring to FIG. 12 and FIG. 13, it should be noted that the first pixel circuit set L in the present disclosure may include not only the first pixel circuit P1, but also the first pixel circuit P2, the first pixel circuit P3 . . . ; the second pixel circuit set B may include not only the second pixel circuit B2, but also the second pixel circuit B3, the second pixel circuit B1. Correspondingly, in addition to the first pixel circuit P1, the first data signal line D1 is further connected to the second pixel circuit B1. Similarly, in addition to the first pixel circuit P2, the second data signal line D2 is further connected to the second pixel circuit B2.

In practical applications, the pixel circuit according to the present disclosure may include more pixel circuit sets, the data signal lines may extend in the column direction, the pixel circuits in the same column may be connected to the same data signal line, and the pixel circuits in different columns may be connected to different data signal lines. The data signals DATA transmitted by the data signal lines may be the same or different according to actual display requirements. In a case that the data signals DATA transmitted by the data signal lines are the same, the data signal lines may share the same data signal DATA. When it is necessary to use the DATA signal to control the opening degree of the driving transistors to control the output current of the driving transistors, the data signals DATA transmitted by the data signal lines may be different from each other.

In some embodiments of the present disclosure, the first pixel circuit set L and the second pixel circuit B in the present disclosure may each be a row of pixels; the pixel circuits in the same row share a same scanning signal, and the pixel circuits in the same column share a same data signal.

In some other embodiments of the present disclosure, the first pixel circuit set L and the second pixel circuit set B in the present disclosure may be pixels of the same color, the data signal lines connected to the R pixels input a same data signal, the data signal lines connected to B pixels input a same data signal, and the data signal lines connected to the G pixels input a same data signal. RGB pixels input different DATA signals according to the respective colors. In this case, the scanning signal lines connected to the R pixels use the same scanning signal, the scanning signal lines connected to the G pixels use the same scanning signal, and the scanning signal lines connected to the B pixels use the same scanning signal. The corresponding data are written each time a scanning signal is input.

Figure 14:
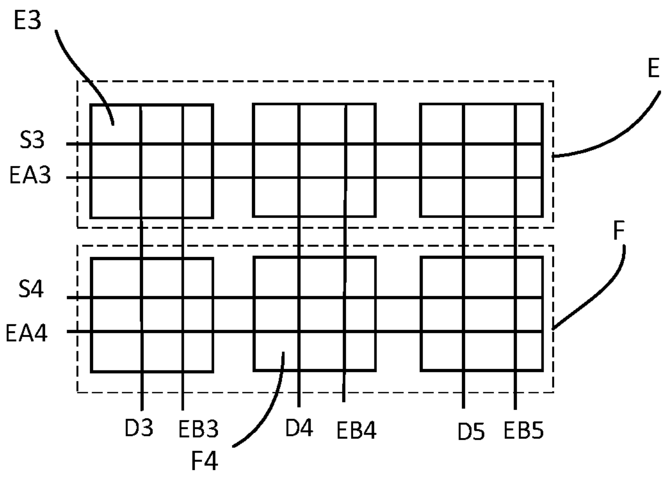
FIG. 14 is a schematic diagram of a display panel according to the present disclosure.
Figure 15:
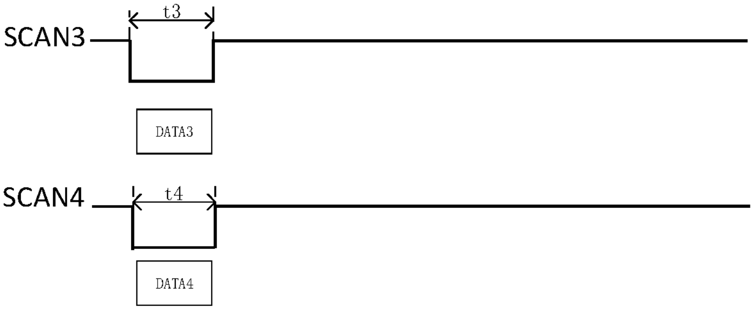
FIG. 15 is a timing diagram of data writing according to the present disclosure.

FIG. 14 is a schematic diagram of a display panel according to the present disclosure; FIG. 15 is a timing diagram of data writing according to the present disclosure. Referring to FIG. 14 and FIG. 15, in some embodiments of the present disclosure, the pixel circuit includes a third pixel circuit set E and a fourth pixel circuit set F, and the scanning signal lines include a third scanning signal line S3 and a fourth scanning signal line S4; the third pixel circuit set E is electrically connected to the third scanning signal line S3, and the third scanning signal line S3 provides the third scanning signal SCAN3 to the third pixel circuit set E; the fourth pixel circuit set F is electrically connected to the fourth scanning signal line S4, and the fourth scanning signal line S4 provides the fourth pixel circuit set F with the fourth scan signal SCAN4; the waveform of the third scanning signal SCAN3 is the same as that of the fourth scanning signal SCAN4.

It should be noted that FIG. 14 and the corresponding FIG. 15 show one embodiment of the present disclosure, which are not intended to limit the pixel circuit and driving timing of the present disclosure. For example, the third pixel circuit set E and the fourth pixel circuit set F may include more or less pixel circuit units; the third pixel circuit set E is not limited to a row of pixels, and the fourth pixel circuit set F is not limited to a row of pixels; the extension direction of the scanning signal lines is not limited to the row direction. The fourth direction in which the scanning signal lines extend may be consistent with the row direction or may be intersected with the row direction. Therefore, the third pixel circuit set E may include multiple pixel circuit units connected to the third scanning signal line S3 in the fourth direction. The fourth pixel circuit set F may include multiple pixel circuit units connected to the fourth scanning signal line S4 in the fourth direction.

In practical applications, the pixel circuit according to the present disclosure may include more pixel circuit sets, and each pixel circuit set is electrically connected to the corresponding scanning signal line. In the same display cycle, the scanning signals transmitted by the respective scanning signal lines are the same to save scan time.

Further referring to FIG. 14 and FIG. 15, the third pixel circuit set E includes a third pixel circuit E3, and the fourth pixel circuit set F includes a fourth pixel circuit F4. The third pixel circuit E3 is connected to the third data signal line S3, and the third data signal line S3 provides the third data signal DATA3 to the third pixel circuit E3 in the activated time period t3 of the third scanning signal SCAN3; the fourth pixel circuit F4 is electrically connected to the fourth data signal line S4, and the fourth data signal line S4 provides the fourth data signal DATA4 to the fourth pixel circuit F4 in the activated time period t4 of the fourth scanning signal SCAN4. The third data signal DATA3 and the fourth data signal DATA4 are the same level signal.

Using the same scanning signal and the same data signal in the pixel scanning stage can effectively save scan time and be easy to drive.

Figure 16:
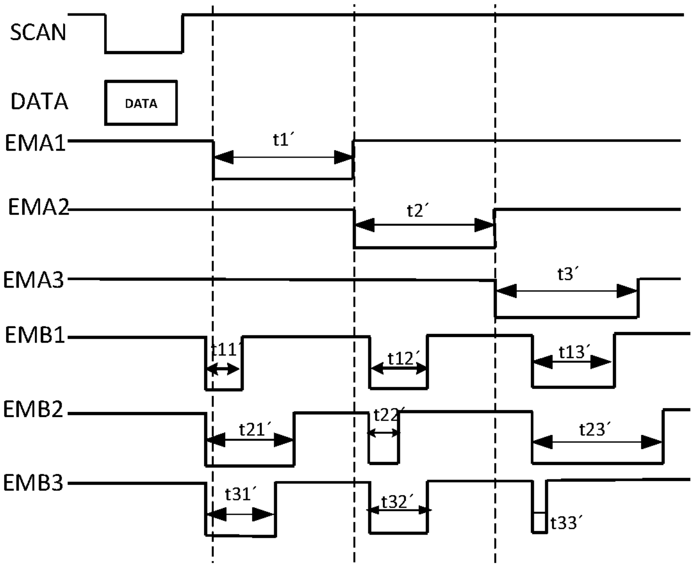
FIG. 16 is a timing diagram of a display panel according to the present disclosure.

FIG. 16 is a timing diagram of a display panel according to the present disclosure. A driving method for the display panel of the present disclosure will be described in detail below with reference to FIG. 5, FIG. 8, FIG. 9 and FIG. 16.

Referring to FIG. 5, the display panel in FIG. 5 includes multiple pixel circuits, such as pixel circuit P1, pixel circuit P2, pixel circuit P3 . . . , and pixel circuit P9, where D1, D2 and D3 are data signal lines, S1, S2 and S3 are all scanning signal lines, EA1, EA2 and EA3 are all first light-emitting control signal lines, and EB1, EB2 and EB3 are all second light-emitting control signal lines.

Referring to FIGS. 5 and 16, when driving the light-emitting element, the same scanning signal SCAN may be inputted to the scanning signal lines S1, S2 and S3, and the same data signal DATA may be written to the data signal lines D1, D2 and D3. Then, the first light-emitting sub-control signal EMA1 is inputted through the first light-emitting sub-control signal line EA1; the second light-emitting sub-control signal EMA2 is inputted through the second light-emitting sub-control signal line EA2; the fifth light-emitting sub-control signal EMA3 is inputted through the fifth light-emitting sub-control signal line EA3; the third light-emitting sub-control signal EMB1 is inputted through the third light-emitting sub-control signal line EB1, the fourth light-emitting sub-control signal EMB2 is inputted through the fourth light-emitting sub-control signal line EB2, and the sixth light-emitting sub-control signal EMB3 is inputted through the sixth light-emitting sub-control signal line EB3. The first light-emitting sub-control signal EMA1 has an activated time period t1', the second light-emitting sub-control signal EMA2 has an activated time period t2', and the fifth light-emitting sub-control signal EMA3 has an activated time period t3', in which the activated time period t1', activated time period t2' and activated time period t3' are transmitted sequentially without overlapped time periods. The third light-emitting sub-control signal EMB1 has a first activated time period t11', a second activated time period t12' and a third activated time period t13'; the fourth light-emitting sub-control signal EMB2 has a first activated time period t21', a second activated time period t22' and a third activated time period t23'; the sixth light-emitting sub-control signal EMB3 has a first activated time period t31', a second activated time period t32' and a third activated time period t33'.

Taking the pixel circuit P1 as an example, the control for the light emission duration of the pixel circuit P1 will be described. With reference to FIG. 16, FIG. 5, FIG. 8 and FIG. 9, the first light-emitting control signal line connected to the pixel circuit P1 is the first light-emitting sub-control signal line EA1, and the second light-emitting control signal line connected to the pixel circuit P1 is the third light-emitting sub-control signal line EB1. In the activated time period t1' of the first light-emitting sub-control signal EMA1, the first light-emitting control device 2 of the pixel circuit P1 is in a turn-on status. The third light-emitting sub-control signal EMB1 has a first activated time period t11'. During the first activated time period t11', the second light-emitting control device 3 of the pixel circuit P1 connected to the third light-emitting sub-control signal line EB1 is in a turn-on status. Since the activated time period t1' of the first light-emitting sub-control signal EMA1 and the first activated time period t11' of the third light-emitting sub-control signal EMB1 have an overlapped period, the first light-emitting control device 2 and the second light-emitting control device 3 of the pixel circuit P1 are both in the turn-on status during the overlapped period, and the light-emitting element driven by the pixel circuit P1 emits light, where the light-emitting duration depends on the overlapped period of the first activated time period t11' and the activated time period t1'. Similarly, the light-emitting durations of other pixel circuits also depend on the overlapped periods of the activated time period of the first light-emitting control line EA and the activated time period of the second light-emitting control line EB connected to the respective pixel circuits.

The scheme of utilizing the same scanning signal and the same data signal for the display panel is more suitable for the drive of inorganic LEDs, and inorganic LEDs are more suitable for operating under the same operating current intensity. In addition, using the same scanning signal and the same data signal for the display panel saves scanning time. It should be noted that, for the convenience of describing the embodiments, it is shown in FIG. 5 that the display panel includes 9 pixel circuits, but it is not meant to limit that the panel includes only 9 pixel circuits. The purpose of this example is to illustrate the driving method in the present disclosure, instead of limiting the structure of the display panel. In practical applications, the quantity of pixel circuits of the panel may be determined according to actual needs.

Referring to FIG. 5 and FIG. 7, or referring to FIG. 5 and FIG. 16, the first light-emitting control signal line includes the first light-emitting sub-control signal line EA1 and the second light-emitting sub-control signal line EA2. The first light-emitting sub-control signal line EA1 transmits the first light-emitting sub-control signal EMA1, the second light-emitting sub-control signal line EA2 transmits the second light-emitting sub-control signal EMA2, the duration of the activated time period t1' of the first light-emitting sub-control signal EMA1 is the same as that of the activated time period t2' of the second light-emitting sub-control signal EMA2, and the activated time periods of the first light-emitting sub-control signal EMA1 and the second light-emitting sub-control signal EMA2 are at least partially non-overlapped.

It should be noted that FIG. 5 and the corresponding FIG. 7 or FIG. 16 show one embodiment of the present disclosure, which are not intended to limit the pixel circuit and driving timing of the present disclosure. In practical applications, the first light-emitting control signal line in the present disclosure may include more light-emitting sub-control signal lines. In the same display cycle, the durations of the activated time periods of light-emitting sub-control signal lines are the same, and the activated time periods of light-emitting sub-control signal lines are at least partially non-overlapped. In some embodiments, the activated time periods of the light-emitting sub-control signal lines may be not overlapped at all.

Referring to FIG. 5, FIG. 5 shows the arrangement of pixel circuits in three rows and three columns, including the first light-emitting sub-control signal line EA1, the second light-emitting sub-control signal line EA2 and the fifth light-emitting sub-control signal line EA3. As shown in FIG. 5, the extension directions of the first light-emitting sub-control signal line EA1, the second light-emitting sub-control signal line EA2 and the fifth light-emitting sub-control signal line EA3 are the same as the row direction. In some embodiments of the present disclosure, the extension directions of the first light-emitting sub-control signal line EA1, the second light-emitting sub-control signal line EA2 and the fifth light-emitting sub-control signal line EA3 may be different from the row direction. In some embodiments of the present disclosure, the first light-emitting sub-control signal line EA1, the second light-emitting sub-control signal line EA2 and the fifth light-emitting sub-control signal line EA3 may be connected to multiple pixel circuits extending in same direction as the respective lines.

Referring to FIG. 7 or FIG. 16, the low-level signals in FIG. 7 and FIG. 16 are activated signals. It can be seen from FIG. 7 or FIG. 16, the activated time periods t1' of the first light-emitting sub-control signal EMA1 transmitted by the first light-emitting sub-control signal line EA1, the activated time periods t2' of the second light-emitting sub-control signal EMA2 transmitted by the second light-emitting sub-control signal line EA2 and the activated time periods t3' of the fifth light-emitting sub-control signal EMA3 transmitted by the fifth light-emitting sub-control signal line EA3 are not overlapped with each other at all. In the present disclosure, the light-emitting time of each light-emitting element is adjustable by changing the signals transmitted by the first light-emitting control signal line and the second light-emitting control signal line, more particularly, by arranging the activated time periods of first light-emitting control signal lines in a staggered manner, which is beneficial to simplify the arrangement of transmission signals of the second light-emitting control signal lines.

Further referring to FIG. 5 and FIG. 7 or referring to FIG. 5 and FIG. 16, in some embodiments of the present disclosure, the second light-emitting control signal line includes a third light-emitting sub-control signal line EB1, and the third light-emitting sub-control signal line EB1 provides the third light-emitting sub-control signal EMB1 to the pixel circuit. Further, the pixel circuit includes a fifth pixel circuit P1, the fifth pixel circuit P1 is electrically connected to the first light-emitting sub-control signal line EA1, and the fifth pixel circuit P1 is electrically connected to the third light-emitting sub-control signal line EB1. The activated time period t1' of the first light-emitting sub-control signal EMA1 is at least partially overlapped with the activated time period t11' of the third light-emitting sub-control signal EMB1.

It should be noted that FIG. 5 and the corresponding FIG. 7 or FIG. 16 show one embodiment of the present disclosure, which are not intended to limit the pixel circuit and driving timing of the present disclosure. In practical applications, the second light-emitting control signal line may further include more light-emitting sub-control signal lines, such as the fourth light-emitting sub-control signal line EB2 and the sixth light-emitting sub-control signal line EB3 as shown in FIG. 5. In the same display cycle, the activated time period t1' of the first light-emitting sub-control signal EMA1 may not only partially overlaps with the activated time period t11' of the third light-emitting sub-control signal EMB1, but also at least partially overlaps with the activated time period t12' of the signal transmitted by the fourth light-emitting sub-control signal line EB2 and the activated time period t13' of the signal transmitted by the sixth light-emitting sub-control signal line EB3. In this way, the light-emitting element is capable of light-emitting only in the overlapped period of the activated time periods of the signals transmitted by the first light-emitting control signal line and the second light-emitting control signal line. In addition, by setting the activated time period of a same first light-emitting sub-control signal EMA1 to be overlapped with activated time periods of the signals transmitted by multiple second light-emitting control signal lines, the quantity of the first light-emitting sub-control signals EMA1 can be reduced and the driving method is made simple.

It should be noted that, in some cases, the activated time period t1' of the first light-emitting sub-control signal EMA1 may completely cover the activated time period t11' of the third light-emitting sub-control signal EMBlI. In this way, the third light-emitting sub-control signal EMB1 completely controls the light emission in the time for one row, which is convenient for driving.

Further referring to FIG. 7 or FIG. 16, in some implementations of the present disclosure, in the same display cycle, the third light-emitting sub-control signal EMB1 includes at least two activated time periods t11' and t12'.

Referring back to FIG. 5, FIG. 5 shows an arrangement of pixel circuits in three rows and three columns, including the first light-emitting sub-control signal line EA1, the second light-emitting sub-control signal line EA2, and the fifth light-emitting sub-control signal line EA3, and further including the third light-emitting sub-control signal line EB1, the fourth light-emitting sub-control signal line EB2 and the sixth light-emitting sub-control signal line EB3. The three first light-emitting control signal lines and the three second light-emitting control signal lines are interlaced with each other to form a grid structure. Each pixel circuit is connected to one first light-emitting control signal line and one second light-emitting control signal line, and three pixel circuits are connected to one same second light-emitting control signal line. For example, the third light-emitting sub-control signal line EB1 is connected to three pixel circuits, the third light-emitting sub-control signal line EB1 is correspondingly set with three activated time periods t11', t12' and t13'. The three activated time periods t11', t12' and t13' set for the third light-emitting sub-control signal line EB1 are overlapped with the activated time period t1' of the first light-emitting sub-control signal line EA1, the activated time period t2' of the second light-emitting sub-control signal line EA2, and the activated time period t3' of the third light-emitting sub-control signal line EA3, respectively. Referring to FIG. 7 together with FIG. 8 and FIG. 9 or FIG. 16, or referring to FIG. 8 and FIG. 9, under the condition that the corresponding activated signals are overlapped with each other, the transistor T1 and the transistor T3 in the pixel circuit connected to the third light-emitting sub-control signal line EB1 are all turned on, or the transistor T1, the transistor T3 and transistor T5 are all turned on, and in this case the corresponding light-emitting element 4 can emit light.

Therefore, the third light-emitting sub-control signal EMB1 in the present disclosure includes at least two activated time periods t11' and t12', which can make the same second light-emitting control signal line have the ability to control the light-emitting time of the light-emitting elements driven by multiple pixel circuits connected to the second light-emitting control signal line. Similarly, such signal setting can reduce the quantity of second light-emitting control lines, and the panel structure and driving method become simple.

It should be noted that the extension directions of the third light-emitting sub-control signal line EB1, the fourth light-emitting sub-control line EB2, and the sixth light-emitting sub-control signal line EB3 in FIG. 5 are the same as the column direction. In other embodiments, the extension directions of the third light-emitting sub-control signal line EB1, the fourth light-emitting sub-control line EB2, and the sixth light-emitting sub-control signal line EB3 may be different from the column direction. In some embodiments of the present disclosure, the third light-emitting sub-control signal line EB1, the fourth light-emitting sub-control line EB2, and the sixth light-emitting sub-control signal line EB3 may be respectively connected to multiple pixel circuits extending in same direction as the signal lines.

In some embodiments of the present disclosure, the third light-emitting sub-control signal EMB1 includes at least two activated time periods t11' and t12' with different durations.

Reference is made to FIG. 5, FIG. 7, FIG. 8 and FIG. 9, or reference is made to FIG. 5, FIG. 16, FIG. 8 and FIG. 9. The low level signals in FIG. 7 and FIG. 16 are activated signals. In the same display cycle, the third light-emitting sub-control signal EMB1 includes at least two activated time periods t11' and t12' with different durations, and the third light-emitting sub-control signal EMB1 can perform differentiation control on the light-emitting time of different light-emitting elements. In case of same first light-emitting sub-control signal, the light-emitting time of the light-emitting element depends on the third light-emitting sub-control signal EMB1. Hence, by setting activated time periods with different durations, differentiation control of the light-emitting time for different light-emitting elements can be realized, and different grayscales for different light-emitting elements can be achieved.

In some embodiments of the present disclosure, the third light-emitting sub-control signal EMB1 includes a first activated time period t11' and a second activated time period t12', where the first activated time period t11' and the activated time period t1' of the first light-emitting sub-control signal EMA1 are overlapped with each other, and the second activated time period t12' and the activated time period t2' of the second light-emitting sub-control signal EMA2 are overlapped with each other.

Referring to FIG. 5, FIG. 7, FIG. 8 and FIG. 9, or referring to FIG. 5, FIG. 16, FIG. 8 and FIG. 9, the first activated time period t11' of the third light-emitting sub-control signal EMB1 and the activated time period t1' of the first light-emitting sub-control signal EMA1 are overlapped with each other, and the second activated time period t12' of the third light-emitting sub-control signal EMB1 and the activated time period t2' of the second light-emitting sub-control signal EMA2 are overlapped with each other. In this way, the third light-emitting sub-control signal EMB1 can cooperate with the first light-emitting sub-control signal EMA1 and the second light-emitting sub-control signal EMA2 in the simplest structure to jointly control the light-emitting time of the light-emitting elements.

In some embodiments, as shown in FIG. 7, the start time of the activated time period t1' of the first light-emitting sub-control signal EMA1 is before the start time of the first activated time period t11', and the activated time period t2' of the second light-emitting sub-control signal EMA2 is before the start time of the second activated time period t12'. By setting the start time of the activated time period t1' of the first light-emitting sub-control signal EMA1 before the start time of the first activated time period t11' of the third light-emitting sub-control signal EMB1, the light-emitting element 4 can be controlled to emit light after the drive device 2 can perform stable current-outputting, which is beneficial for the display panel to output display images stably.

In other embodiments, as shown in FIG. 16, the start time of the activated time period t1' of the first light-emitting sub-control signal EMA1 is after the start time of the first activated time period t11', and the activated time period t2' of the second light-emitting sub-control signal EMA2 is before the start time of the second activated time period t12', which facilitates the flexible control of the light-emitting duration.

Further referring to FIG. 5 and FIG. 7 or referring to FIG. 5 and FIG. 16, in some embodiments of the present disclosure, the second light-emitting control signal line includes a fourth light-emitting sub-control signal line EB2, and the fourth light-emitting sub-control signal line EB2 provides the pixel circuit with a fourth light-emitting sub-control signal EMB2; the duration of at least one activated time period of the fourth light-emitting sub-control signal EMB2 is different from the duration of at least one activated time period of the third light-emitting sub-control signal EMB1.

Referring to FIG. 7 or FIG. 16, the third light-emitting sub-control signal EMB1 includes the first activated time period t11', the second activated time period t12' and the third activated time period t13'. The fourth light-emitting sub-control signal EMB2 includes the first activated time period t21', a second activated time period t22' and a third activated time period t23'. The first activated time period t11' of the third light-emitting sub-control signal EMB1 is different from the first activated time period t21', the second activated time period t22' and the third activated time period t23' of the fourth light-emitting sub-control signal EMB2.

With reference to FIG. 7, FIG. 8 and FIG. 9 or with reference to FIG. 16, FIG. 8 and FIG. 9, in a case that the duration of the activated time period of the fourth light-emitting sub-control signal EMB2 is different from that of the third light-emitting sub-control signal EMB1, the turn-on time of the third transistor T3 to which the fourth light-emitting sub-control signal EMB2 is input is different from that of another third transistor T3 to which the fourth light-emitting sub-control signal EMB2 is input, which may result in difference in light-emitting time of corresponding light-emitting elements 4.

In the present disclosure, the duration of at least one activated time period of the fourth light-emitting sub-control signal EMB2 is different from that of at least one activated time period of the third light-emitting sub-control signal EMB1, which can make the light-emitting element driven by the pixel circuit connected to the third light-emitting sub-control signal line EB1 different from the light-emitting element driven by the pixel circuit connected to the fourth light-emitting sub-control signal line EB2. By doing so, it is convenient to realize the adjustment of the light-emitting time of the light-emitting elements driven by different second light-emitting control signal lines, to achieve gray-scale adjustment for different light-emitting elements.

In some embodiments of the present disclosure, the waveform of the fourth light-emitting sub-control signal EMB2 is different from that of the third light-emitting sub-control signal EMB1.

Referring to FIG. 7 or FIG. 16, the waveforms of the fourth light-emitting sub-control signal EMB2 and the third light-emitting sub-control signal EMB1 are different, for example in that the pulse width or the rising edge or the falling edge of the corresponding activated time periods of the fourth light-emitting sub-control signal EMB2 and the third light-emitting sub-control signal EMB1 are different. By adjusting the pulse width of activated time periods included in the fourth light-emitting sub-control signal EMB2 and the third light-emitting sub-control signal EMB1, together with the time at which each activated time period appears, the light-emitting time of the light-emitting element may be adjusted.

Figure 17:
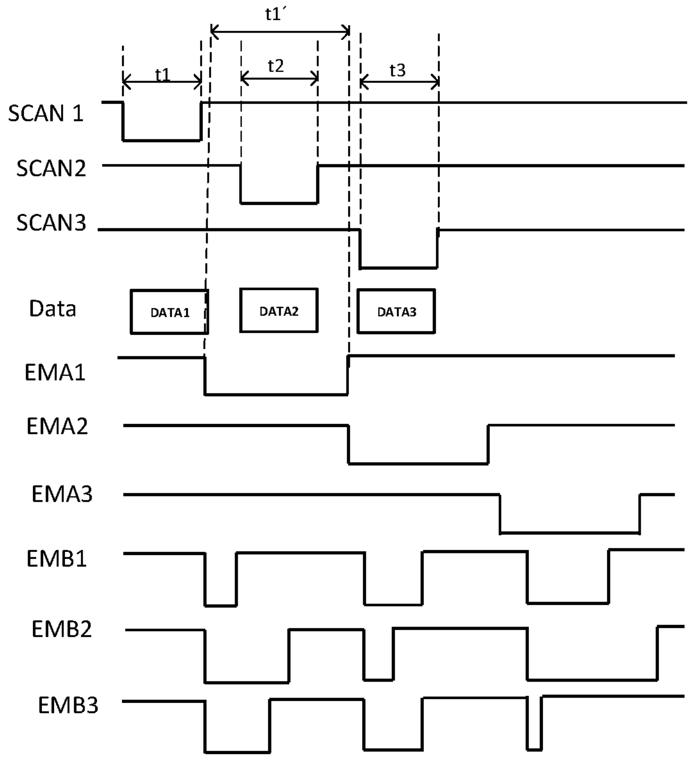
FIG. 17 is a driving timing diagram of a display panel according to the present disclosure.

FIG. 17 shows a driving timing diagram of a display panel according to the present disclosure. Referring to FIG. 5 and FIG. 17, in some embodiments of the present disclosure, the first direction V1 is parallel to the fourth direction V4, and the second direction V2 is parallel to the third direction V3. In a period of one frame, the first transmitted activated time period t1' on the first light-emitting control signal line is located after the end of the first transmitted activated time period t1 on the scanning signal line, and is located before the start time of the latest transmitted activated time period t3 on the scanning signal line.

In an embodiment of the present disclosure, referring to FIG. 5, the pixel circuits shown in FIG. 5 are arranged in a matrix of three rows and three columns. The pixel circuits are used to control the corresponding light-emitting elements. The signal lines include data signal lines, scanning signal lines, first light-emitting control signal lines and second light-emitting control signal lines. The data signal lines include the first data signal line D1, the second data signal line D2 and the third data signal line D3. The scanning signal lines include the first scanning signal line S1, the second scanning signal line S2 and the third scanning signal line S3. The first light-emitting control signal lines include the first light-emitting sub-control signal line EA1, the second light-emitting sub-control signal line EA2 and the fifth light-emitting sub-control signal line EA3; the second light-emitting control signal lines include the third light-emitting sub-control signal line EB1, the fourth light-emitting sub-control signal line EB2 and the sixth light-emitting sub-control signal line EB3. Each pixel circuit is electrically connected to the corresponding first light-emitting control signal line and the corresponding second light-emitting control signal line.

As shown in FIG. 5, the scanning signal lines extend in the same direction as the first light-emitting control signal lines, and the data signal lines extend in the same direction as the second light-emitting control signal lines. The pixel circuits may be divided into three sets in the first direction and be divided into three sets in the second direction. The pixel circuits arranged in the first direction and located in the same set may be electrically connected to the same scanning signal line and connected to the same first light-emitting control signal line. The pixel circuits arranged in the first direction and located in different sets may be electrically connected to different scanning signal lines and connected to different first light-emitting control signal lines. The pixel circuits arranged in the second direction and located in the same set may be electrically connected to the same data signal line and connected to the same second light-emitting control signal line. The pixel circuits arranged in the second direction and located in different sets may be electrically connected to different data signal lines and connected to different second light-emitting control signal lines.

Referring to FIG. 9, each pixel circuit includes a first sub-control device 21, a second sub-control device 22, a drive device 1, a second light-emitting control device 3, a data writing device 5 and a capacitor C, where the first sub-control device 21 includes a first transistor T1, the second sub-control device 22 includes a fifth transistor T5, the drive device 1 includes a second transistor T2, the second light-emitting control device 3 includes a third transistor T3, and the data writing device 5 includes a fourth transistor T4. The source of the first transistor T1 is used to receive the first power supply signal VDD, the drain of the first transistor T1 is electrically connected to the source of the second transistor T2, the gate of the first transistor T1 is electrically connected to the first light-emitting control signal line. The first light-emitting control signal line is used to transmit the first light-emitting control signal EMA. The source of the fifth transistor T5 is electrically connected to the drain of the second transistor T2, the drain of the fifth transistor T5 is electrically connected to the source of the third transistor T3, and the gate of the fifth transistor T5 is electrically connected to the first light-emitting control signal line. The drain of the third transistor T3 is electrically connected to the anode of the light-emitting element 4, and the gate of the third transistor T3 is electrically connected to the second light-emitting control signal line. The second light-emitting control signal line is used to transmit the second light-emitting control signal EMB, and the drain of the fourth transistor T4 is connected to the gate of the second transistor T2.

With reference to FIG. 5, FIG. 9 and FIG. 17, the first light-emitting control device 2 in the present disclosure includes the first sub-control device 21 and the second sub-control device 22, the second sub-control device 22 is located between the drive device 1 and the second light-emitting control device 3 and mainly functions to stabilize the driving current of the drive device 1, and the second light-emitting control device 22 of the pixel circuit connected to the first scanning signal line S1 may be in the turn-on status in the case that the pixel circuit connected to the first scanning signal line S1 has finished the data-writing while other pixel circuits are in the process of data-writing. Further referring to FIG. 17, the display panel in the present disclosure may be driven as follows.

Firstly, data is written into the connected pixel circuits through the first scanning signal line S1, the second scanning signal line S2 and the third scanning signal line S3 in sequence.

Then, after data writing is performed through the first scanning signal line S1, the first sub-control devices 21 and the second sub-control devices 22 are turned on through the connected first light-emitting sub-control signal line EA1, the second light-emitting sub-control signal line EA2, and the fifth light-emitting sub-control signal line EA3 in sequence. At one moment, only the first light-emitting control devices 21 and the second sub-control devices 22 that are connected to one first light-emitting control signal line are in the turn-on status. The second light-emitting control devices 3 are turned on through the third light-emitting sub-control signal line EB1, the fourth light-emitting sub-control signal line EB2 and the sixth light-emitting sub-control signal line EB3. Eventually, the light-emitting element driven by the pixel circuit where the first sub-control device 21, the second sub-control device 22 and the second light-emitting control device 3 simultaneously in the turn-on status locate emits light.

Figure 18:
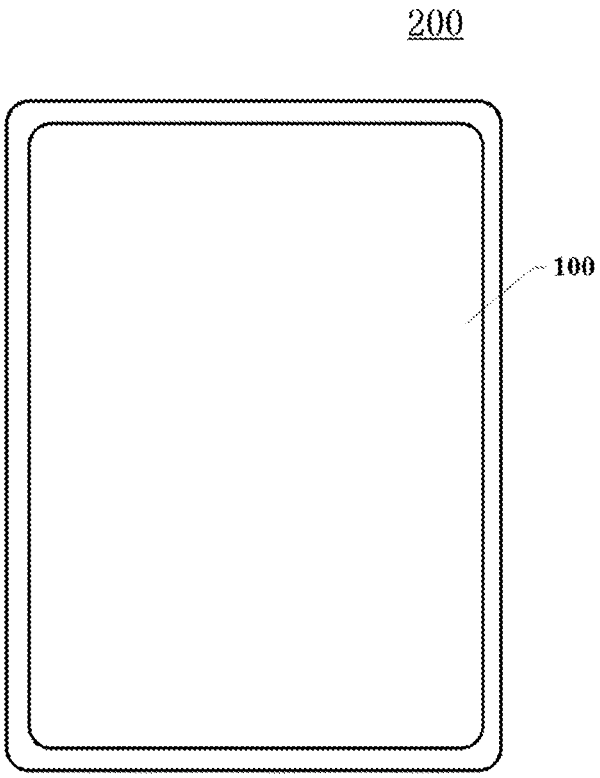
FIG. 18 is a schematic structural diagram of a display device according to the present disclosure.

Based on the embodiments, a display device is further provided according to the present disclosure. Referring to FIG. 18, FIG. 18 shows a schematic structural diagram of a display device according to the present disclosure. In this embodiment, the display device 200 includes the display panel 100 according to any embodiments provided in the present disclosure above.

It can be understood that the display device 200 provided in the embodiment of the present disclosure may be a computer, a mobile phone, a tablet, and other display devices with a display function, which is not limited in the present disclosure. The display device provided according to the embodiment of the present disclosure has the beneficial effect of the display panel provided according to the embodiment of the present disclosure, the details of which may be referred to the specific descriptions of the display panel in the above embodiments, and will not be repeated herein.

In conclusion, according to the present disclosure, the display panel and the display device at least have the beneficial effects as follows.

Firstly, in the present disclosure, the light-emitting duration of the light-emitting element is controlled jointly via the first light-emitting control device and the second light-emitting control device, where the control signals of the first light-emitting control device and the second light-emitting control device can be transmitted through the first light-emitting control signal line and the second light-emitting control signal line respectively. As a result, the grayscale of each pixel can be adjusted by changing the control signals transmitted by the first light-emitting control signal line and the second light-emitting control signal line. In addition, the first light-emitting control signal lines and the second light-emitting control signal lines are in an intersected arrangement in the present disclosure, and the first light-emitting control signal lines and the second light-emitting control signal lines can form a grid-like control structure, which is conducive to reducing the quantity of the first light-emitting control signal lines and the second light-emitting control signal lines. Hence, a simple structure and convenient control are achieved, which are beneficial to achieve high PPI. Secondly, the adjustment of the grayscale of the light-emitting element in the present disclosure can be realized by adjusting the light-emitting time of the light-emitting element; and the adjustment of the grayscale can also be realized by controlling the output current of the drive device via the data writing device. In this way, the grayscale of the light-emitting element can be adjusted in terms of both light-emitting time and light-emitting intensity, to achieve more levels of grayscale adjustment and more delicate presentation of images. Thirdly, the first light-emitting control device in the present disclosure includes a first sub-control device 21 and a second sub-control device 22, the second sub-control device 22 is located between the drive device 1 and the second light-emitting control device 3 and mainly functions to stabilize the driving current of the drive device 1, and the second light-emitting control device 3 in the pixel circuit of the current row can be turned on in the case that the pixel circuit of the current row has finished the data-writing while pixel circuits of other rows are in the process of data-writing. Compared to the related technology, the light-emitting stage of the light-emitting element 4 can made happen earlier by setting the second sub-control device 22 in the present disclosure. Further, same scanning signal and same data signal are utilized in the pixel scanning stage in the present disclosure, which can effectively save the scan time and make the driving process simple. Finally, in the present disclosure, the activated time period of the same first light-emitting sub-control signal EMA1 is overlapped with activated time periods of signals transmitted by multiple second light-emitting control signal lines; the third light-emitting sub-control signal EMB1 includes at least two activated time periods; the third light-emitting sub-control signal EMB1 includes at least two activated time periods with different durations; and the duration of at least one activated time period of the fourth light-emitting sub-control signal EMB2 is different from the duration of at least one activated time period of the third light-emitting sub-control signal EMB1. In this way, the quantity of signal lines can be reduced, and the light-emitting time of each pixel can be adjusted, which further simplifies the structure and driving method of the display panel.

What is claimed is:

1. A display panel comprising:

pixel circuits;

light-emitting elements; and signal lines; wherein for one of the pixel circuits:

the one of the pixel circuits is electrically connected to at least one of the light-emitting elements;

the one of the pixel circuits comprises a drive device, a first light-emitting control device and a second light-emitting control device;

the drive device is configured to drive the light-emitting element to emit light; and the first light-emitting control device and the second light-emitting control device are configured to jointly control a light-emitting duration of the light-emitting element;

the signal lines comprise a first light-emitting control signal line and a second light-emitting control signal line, wherein the first light-emitting control signal line extends in a first direction parallel to a plane where the display panel is located, and the first light-emitting control signal line is connected with a first plurality of pixel circuits arranged along the first direction and is connected to the first light-emitting control devices in the first plurality of pixel circuits; the second light-emitting control signal line extends in a second direction parallel to the plane where the display panel is located, and the second light-emitting control signal line is connected with a second plurality of pixel circuits arranged along the second direction and is connected to the second light-emitting control devices in the second plurality of pixel circuits, wherein the first direction intersects with the second direction.

2. The display panel according to claim 1, wherein the one of the pixel circuits comprises a data writing device, and the data writing device is configured to transmit data signal to a control terminal of the drive device.

3. The display panel according to claim 2, wherein the first light-emitting control device comprises a first sub-control device, a first terminal of the first sub-control device is configured to receive a first power supply signal, a second terminal of the first sub-control device is electrically connected to a first terminal of the drive device, and a control terminal of the first sub-control device is electrically connected to the first light-emitting control signal line; and a first terminal of the second light-emitting control device is electrically connected to the drive device, a second terminal of the second light-emitting control device is electrically connected to the light-emitting element, and a control terminal of the second light-emitting control device is electrically connected to the second light-emitting control signal line.

4. The display panel according to claim 3, wherein the first light-emitting control device further comprises a second sub-control device, the second sub-control device is located between the drive device and the second light-emitting control device, a first terminal of the second sub-control device is electrically connected to a second terminal of the drive device, and a second terminal of the second sub-control device is electrically connected to the first terminal of the second light-emitting control device, a control terminal of the second sub-control device is electrically connected to the first light-emitting control signal line.

5. The display panel according to claim 2, wherein the one of the pixel circuits comprises a capacitor, a first plate of the capacitor is electrically connected to the control terminal of the drive device, and a second plate of the capacitor is electrically connected to a first fixed potential line.

6. The display panel according to claim 2, wherein a first terminal of the data writing device is electrically connected to a data signal line, the data signal line extends in a third direction, and the third direction is parallel to the plane where the display panel is located; and a control terminal of the data writing device is electrically connected to a scanning signal line, the scanning signal line extends in a fourth direction, the fourth direction is parallel to the plane where the display panel is located, and the third direction intersects with the fourth direction.

7. The display panel according to claim 6, wherein the third direction is parallel to the first direction; or, the third direction is parallel to the second direction; or wherein the third direction intersects with the first direction, and the third direction intersects with the second direction; or the first direction is parallel to the fourth direction, and the first direction intersects with the third direction.

8. The display panel according to claim 6, wherein the first direction is parallel to the fourth direction, and the second direction is parallel to the third direction; and in a frame period, an activated time period first transmitted on the first light-emitting control signal line is located after an end of an activated time period first transmitted on the scanning signal line, and is located prior to a start time of an activated time period latest transmitted on the scanning signal line.

9. The display panel according to claim 2, wherein the one of the pixel circuits comprises a first pixel circuit set and a second pixel circuit set, and scanning signal lines comprise a first scanning signal line and a second scanning signal line;

the first pixel circuit set is electrically connected to the first scanning signal line, and the first scanning signal line provides a first scanning signal to the first pixel circuit set; the second pixel circuit set is electrically connected to the second scanning signal line, and the second scanning signal line provides a second scanning signal to the second pixel circuit set; and in a same display cycle, a duration of an activated time period of the first scanning signal is the same as an activated time period of the second scanning signal, and the activated time period of the first scanning signal and the activated time period of the second scanning signal are at least partially non-overlapped.

10. The display panel according to claim 9, wherein the first pixel circuit set comprises a first pixel circuit, the second pixel circuit set comprises a second pixel circuit, wherein, the first pixel circuit is electrically connected to a first data signal line, and the first data signal line provides a first data signal to the first pixel circuit in the activated time period of the first scanning signal; and the second pixel circuit is electrically connected to a second data signal line, and the second data signal line provides a second data signal to the second pixel circuit in the activated time period of the second scanning signal.

11. The display panel according to claim 2, wherein the one of the pixel circuits comprises a third pixel circuit set and a fourth pixel circuit set, and scanning signal lines comprise a third scanning signal line and a fourth scanning signal line;

the third pixel circuit set is electrically connected to the third scanning signal line, and the third scanning signal line provides a third scanning signal to the third pixel circuit set; the fourth pixel circuit set is electrically connected to the fourth scanning signal line, and the fourth scanning signal line provides a fourth scanning signal to the fourth pixel circuit set; and waveforms of the third scanning signal and the fourth scanning signal are the same.

12. The display panel according to claim 11, wherein the third pixel circuit set comprises a third pixel circuit, the fourth pixel circuit set comprises a fourth pixel circuit, wherein, the third pixel circuit is electrically connected to a third data signal line, and the third data signal line provides a third data signal to the third pixel circuit in an activated time period of the third scanning signal;

the fourth pixel circuit is electrically connected to a fourth data signal line, and the fourth data signal line provides a fourth data signal to the fourth pixel circuit in an activated time period of the fourth scanning signal; and the third data signal and the fourth data signal are same level signals.

13. A display panel comprising:

a pixel circuit;

a light-emitting element; and signal lines; wherein the pixel circuit is electrically connected to the light-emitting element, and the pixel circuit comprises a drive device, a first light-emitting control device and a second light-emitting control device;

the drive device is configured to drive the light-emitting element to emit light;

the first light-emitting control device and the second light-emitting control device are configured to jointly control a light-emitting duration of the light-emitting element;

the signal lines comprise a first light-emitting control signal line and a second light-emitting control signal line, wherein the first light-emitting control device is electrically connected to the first light-emitting control signal line, the first light-emitting control signal line extends in a first direction, and the first direction is parallel to a plane where the display panel is located; the second light-emitting control device is connected to the second light-emitting control signal line, the second light-emitting control signal line extends in a second direction, and the second direction is parallel to the plane where the display panel is located, wherein the first direction intersects with the second direction, wherein the first light-emitting control signal line comprises a first light-emitting sub-control signal line and a second light-emitting sub-control signal line; the first light-emitting sub-control signal line transmits a first light-emitting sub-control signal, the second light-emitting sub-control signal line transmits a second light-emitting sub-control signal, a duration of an activated time period of the first light-emitting sub-control signal is the same as a duration of an activated time period of the second light-emitting sub-control signal, and the activated time period of the first light-emitting sub-control signal and the activated time period of the second light-emitting sub-control signal are at least partially non-overlapped.

14. The display panel according to claim 13, wherein the second light-emitting control line comprises a third light-emitting sub-control signal line, and the third light-emitting sub-control signal line provides a third light-emitting sub-control signal to the pixel circuit; and the pixel circuit comprises a fifth pixel circuit, the fifth pixel circuit is electrically connected to the first light-emitting sub-control signal line, and the fifth pixel circuit is electrically connected to the third light-emitting sub-control signal line, wherein the activated time period of the first light-emitting sub-control signal and an activated time period of the third light-emitting sub-control signal are at least partially overlapped.

15. The display panel according to claim 14, wherein the third light-emitting sub-control signal comprises at least two activated time periods in one display cycle.

16. The display panel according to claim 15, wherein the third light-emitting sub-control signal comprises at least two activated time periods with different durations.

17. The display panel according to claim 15, wherein the third light-emitting sub-control signal comprises a first activated time period and a second activated time period, the first activated time period overlaps with the activated time period of the first light-emitting sub-control signal, and the second activated time period overlaps with the activated time period of the second light-emitting sub-control signal.

18. The display panel according to claim 14, wherein the second light-emitting control signal line comprises a fourth light-emitting sub-control signal line, and the fourth light-emitting sub-control signal line provides a fourth light-emitting sub-control signal to the pixel circuit; and a duration of at least one activated time period of the fourth light-emitting sub-control signal is different from a duration of at least one activated time period of the third light-emitting sub-control signal.

19. The display panel according to claim 18, wherein a waveform of the fourth light-emitting sub-control signal is different from that of the third light-emitting sub-control signal.

20. A display device comprising a display panel, wherein the display panel comprises pixel circuits, light-emitting elements and signal lines, wherein:

for one of the pixel circuits:

the one of the pixel circuits is electrically connected to at least one of the light-emitting elements; the light emitting element, and the one of the pixel circuits comprises a drive device, a first light-emitting control device and a second light-emitting control device;

the drive device is configured to drive the light-emitting element to emit light; and the first light-emitting control device and the second light-emitting control device are configured to jointly control a light-emitting duration of the light-emitting element;

the signal lines comprise a first light-emitting control signal line and a second light-emitting control signal line, wherein the first light-emitting control signal line extends in a first direction parallel to a plane where the display panel is located, and the first light-emitting control signal line is connected with a first plurality of pixel circuits arranged along the first direction and is connected to the first light-emitting control devices in the first plurality of pixel circuits; the second light-emitting control signal line extends in a second direction parallel to the plane where the display panel is located, and the second light-emitting control signal line is connected with a second plurality of pixel circuits arranged along the second direction and is connected to the second light-emitting control devices in the second plurality of pixel circuits, wherein the first direction intersects with the second direction.

* * * * *